United States Patent [19]
Honkasalo et al.

[11] Patent Number: 5,991,627
[45] Date of Patent: *Nov. 23, 1999

[54] CONTROL OF HANDOVER AND TRANSMISSION POWER CONTROL OF MOBILE STATION IN A MOBILE TELECOMMUNICATIONS SYSTEM

[75] Inventors: Zhi-Chun Honkasalo; Harri Honkasalo, both of Bedford, Tex.; Harri Jokinen, Hiisi; Harri Posti, Oulu, both of Finland; David Lin, Frisco, Tex.

[73] Assignee: Nokia Telecommunications Oy, Espoo, Finland

[ * ] Notice: This patent is subject to a terminal disclaimer.

[21] Appl. No.: 08/676,043

[22] Filed: Jul. 5, 1996

Related U.S. Application Data

[63] Continuation-in-part of application No. 08/591,557, filed as application No. PCT/FI95/00249, May 10, 1995.

[30] Foreign Application Priority Data

May 11, 1994 [FI] Finland ................................. 942191

[51] Int. Cl.[6] ...................................................... H04Q 7/22
[52] U.S. Cl. ........................ 455/437; 455/522; 455/67.1; 455/226.1
[58] Field of Search ...................................... 455/436, 437, 455/438, 439, 450–52, 500, 501, 517, 522, 525, 67.1, 726.1, 226.2, 226.3, 435; 375/200

[56] References Cited

U.S. PATENT DOCUMENTS

| | | | |
|---|---|---|---|
| 4,763,322 | 8/1988 | Eizenhofer | 370/95 |
| 4,972,506 | 11/1990 | Uddenfeldt | 455/33 |
| 5,199,031 | 3/1993 | Dahlin | 320/110.1 |
| 5,579,373 | 11/1996 | Jang | 379/59 |
| 5,603,081 | 2/1997 | Raith et al. | 455/435 |

FOREIGN PATENT DOCUMENTS

| | | |
|---|---|---|
| 332 818 | 9/1989 | European Pat. Off. . |
| 615 353 | 9/1994 | European Pat. Off. . |
| 0 671 824 A1 | 9/1995 | European Pat. Off. . |

*Primary Examiner*—Wellington Chin
*Assistant Examiner*—Philip J. Sobutka
*Attorney, Agent, or Firm*—Pillsbury Madison & Sutro LLP

[57] ABSTRACT

The invention relates to controlling transmission power and carrying out a handover during a data transmission over the radio path between a mobile station and a base station (BTS) in a mobile telecommunications system. A mobile station can be allocated at least two traffic channels for a high-speed data transmission. The mobile station is arranged to measure the characteristics of the received signal, such as the signal level and/or quality, in each of the allocated traffic channels. The radio network is arranged to control the transmitting power of the mobile and base stations and make the decision on a handover on the basis of a combination of measurement results of two or more traffic channels, or on the basis of the measurement result of the poorest traffic channel.

42 Claims, 9 Drawing Sheets

TCH/F - MULTIFRAME

CONTROL OF HANDOVER AND TRANSMISSION POWER CONTROL OF MOBILE STATION IN A MOBILE TELECOMMUNICATIONS SYSTEM

RELATED APPLICATIONS

This is a continuation-in-part (CIP) of Application 08/591,557 now U.S. Pat. No. 5,898,925, filed on Jan. 11, 1996 which is a 371 of PCT/FI95/00249, filed May 10, 1995.

FIELD OF THE INVENTION

The present invention relates to methods and an arrangement for power control of a mobile station, and performing a handover in a mobile telecommunications system in which data is transmitted over the radio path between a mobile station and a base station.

BACKGROUND OF THE INVENTION

There are several multiple access modulation techniques for facilitating communications in which a large number of mobile users are present. These techniques include time division multiple access (TDMA), code division multiple access (CDMA) and frequency division multiple access (FDMA).

In TDMA radio telecommunication systems, time division communication in the radio path takes place in successive TDMA frames each of which consists of several time slots. In each time slot, a short information packet is sent as a radio frequency burst of a finite duration, which burst consists of a number of modulated bits. For the most part, time slots are used for the transmission of control channels and traffic channels. On the traffic channels, speech and data are transmitted. On the control channels, signalling between a base station and mobile subscriber stations is carried out. The Pan-European mobile system GSM (Global System for Mobile Communications) is an example of a TDMA radio system.

CDMA is a modulation and multiple access scheme based on spread spectrum communication. Unlike FDMA or TDMA, in CDMA a large number of CDMA signals (users) simultaneously share the same wide band radio channel, typically 1.25 MHz. Pseudorandom noise (PN) binary codes, so-called spreading codes, are used to distinguish between different CDMA signals, i.e, traffic channels on said wide band radio channel. A separate spreading code is used over each connection between a base station and a subscriber terminal. In other words, the narrow-band data signal of the user is conventionally multiplied by the dedicated spreading code and thereby spread in bandwidth to the relatively wide band radio channel. The signals of the users can be distinguished from one another in the receivers on the basis of the unique spreading code of each connection, by using a correlator which accepts only a signal energy from the selected spreading code and despreads its spectrum into a narrow-band signal. The other users' signals, whose spreading codes do not match, are not despread in bandwidth and as a result, contribute only to the noise and represent a self-interference generated by the system. The spreading codes of the system are preferably selected in such a way that the codes used in each system cell are mutually orthogonal, i.e., they do not correlate with each other. Thus, in the CDMA systems, the spreading code unique to each user or user's signal provides a traffic channel in a similar sense to a time slot in the TDMA systems. CDMA is described more detailly in the document: "An overview of the application of code division multiple access (CDMA) to digital cellular systems and personal cellular networks", Qualcomm Incorporated, 1992, USA, (Document Number EX60-10010).

In traditional TDMA and CDMA mobile communications systems, the maximum data rate at the radio interface is relatively low.

For communication in conventional mobile systems, each mobile station is assigned one traffic channel for data or speech transmission. Thus, a GSM system, for example, can have as many as eight simultaneous connections to different mobile stations on a same carrier frequency. The maximum data transfer rate on a traffic channel is restricted to a relatively low level according to the bandwidth in use as well as channel coding and error correction, for example in a GSM system to 9.6 kbit/s or 12 kbit/s. In addition, in a GSM system a half-speed traffic channel (max. 4.8 kbit/s) can be chosen for low speeds of speech coding. The half-speed traffic channel is established when a mobile station communicates in a specific time slot only in every second frame, in other words, in half-speed. A second mobile station communicates in every second frame in the same time slot. This is how the capacity of the system can be doubled as far as the number of subscribers is concerned, in other words, on the same carrier wave it is possible for up to 16 mobile stations to communicate simultaneously.

In the last few years, the need for high-speed data services in mobile communication networks has remarkably increased. Data transfer rates of at least 64 kbit/s would be needed to utilize, for example, ISDN (Integrated Services Digital Network) circuit switched digital data services. PSTN data services of the public telephone network, such as modems and telefax terminals of class G3, require faster transfer rates, such as 14.4 kbit/s. One of the growing areas of mobile data transfer requiring higher transfer rates is the mobile video service. As examples of this kind of services, security control by cameras and video databases can be mentioned. The minimum data transfer rate in video transfer can be, for example, 16 or 32 kbit/s.

The data transfer rates of the present mobile communication networks are not, however, sufficient to satisfy this kind of new needs.

SUMMARY OF THE INVENTION

It is an object of the present invention to enable higher data transfer rates in mobile communication networks.

Another object of the invention is a handover and power control in connection with high-speed data transmission.

This object is achieved by a method for power control in a mobile telecommunications system, said method comprising:

allocating the mobile station at least two parallel traffic channels for high-speed data transmission over the radio path between a mobile station and a base station of a fixed radio network, transmitting a data signal over said allocated traffic channels, measuring the characteristics of the received data signal, such as signal level and/or quality, at the mobile station in each of said allocated traffic channels, controlling the transmitting power of said base station on the basis of a combination of measurement results of two or more of said allocated traffic channels, or on the basis of a measurement result of the poorest one of said allocated traffic channels.

The invention also relates to a handover method in a mobile telecommunications system said method comprising:

allocating the mobile station at least two parallel traffic channels for high-speed data transmission over the radio path between a mobile station and a base station of a fixed radio network, measuring the characteristics of the received data signal, such as signal level and/or quality, at the mobile station in each of said allocated traffic channels, making a handover decision on the basis of a combination of measurement results of two or more of said allocated traffic channels, or on the basis of a measurement result of the poorest one of said allocated traffic channels.

The invention also relates to a control arrangement of a mobile station in a mobile telecommunications system for transmitting data over the radio path between a mobile station and a base station of a fixed radio network, said arrangement comprising the fixed network being arranged to allocate to a mobile station can be allocated at least two traffic channels for high-speed data transmission, a mobile station being arranged to measure the characteristics of the received signal, such as signal level and/or quality, in each of said allocated traffic channels, and the fixed radio network being arranged to control the transmitting power of a base station and/or make a handover decision on the basis of a combination of measurement results of two or more of said allocated traffic channels, or on the basis of a measurement result of the poorest one of said allocated traffic channels.

The invention employs a so-called multi-channel technique so that a mobile station has access to two or more traffic channels for one data call. The high-speed data signal to be transmitted over the radio path is split into a required number of data signals of lower speed, each signal being transmitted through respective one of the allocated traffic channels. As soon as the data signals of lower speed have separately been transmitted over the radio path, they are again at the receiving end combined into the original high-speed signal. This is how the data transfer rate can be doubled, tripled, etc., depending on whether two, three or more traffic channels are assigned to be used by a subscriber. In a GSM system, for example, two traffic channels (time slots) will enable a data transfer speed of 2×9.6 kbit/s which is enough for a modem of 14.4 kbit/s, or a telefax terminal, for example. Six time slots will enable a data transfer rate of 64 kbit/s.

The multi-channel technique in according to the invention, in which a high-speed data signal is transmitted as several lower-speed signals through several parallel traffic channels, has many advantages over an alternative approach in which a mobile station is assigned a single higher-capacity traffic channel having higher maximum data transmission speed than a standard traffic channel. In TDMA systems, for example, a high-speed data signal may be transmitted as several bursts in several time slots within one frame, whereas in an alternative approach in which a mobile station may be assigned several time slots in the same frame for data transmission, but the whole data signal is transmitted as one burst extended for the time of the assigned time slots. In the present invention, there is no need to change the other significant characteristics of the physical transmission path, eg. radio path and traffic channel structure. In TDMA systems, for example, these characteristics may include (at radio interface, for example, Layer 1 of GSM), such as frequency division, frame format and time slot configuration, data transfer rate, error correction, modulation, format of a TDMA burst, bit error ratio (BER), etc. In other words, the present invention allows to support different kind of subscriber data transfer rates in the radio system by a single structure of a physical transmission path. Consequently there is no need to support several structures of a physical transmission path by the subscriber terminals, either.

The multi-channel technique of the invention enables each traffic channel allocated to a mobile station to be handled as an independent traffic channel with regard to measurements, transmitting of measurement reports, and power control. Each traffic channel is measured independently. In the primary embodiment of the invention, it is possible to carry out the power control and the reporting of measurement results independently for each traffic channel by associating an individual, parallel control channel with each traffic channel. This is advantageous, because the signal quality can vary considerably in different traffic channels due to, for example, different interference conditions. By the split power control, a more optimal multi-channel system can be obtained with regard to power used and the quality of the received signal. An optimized use of transmitting power means a lower average transmitting power, which leads to a longer battery life. The average interference level in the system is also decreased resulting in a higher system capacity.

In a second embodiment of the invention, all the traffic channels have their own control channels through which measurement reports are transmitted, but power control is performed for each channel through only one single control channel in the direction from the fixed network to a mobile station. Similar kinds of improvements in the performance of the system, albeit of less importance, are obtained by using a common, parallel control channel for all traffic channels assigned to a mobile station so that a combination of measurement results of all of the allocated traffic channels, for example, average value, is transmitted to the fixed radio network over the common control channel. The fixed radio network controls the transmitting power of the mobile station through the same common control channel.

The reliability of handover decisions can also be improved in a multi-channel system in cases every traffic channel assigned to a mobile station is independently measured in accordance with the invention, and the handover decision is made on the basis of a combination of the measurement results, such as average value, or on the basis of the poorest one of the allocated traffic channels.

In TDMA systems, the implementation may be especially simple if adjacent time slots are employed. Consequently, it will be easier to carry out various measurements the remaining part of the frame, and increasing the number of frequency synthesizers in the receiver of the mobile station is avoided. In the GSM system, it is especially advantageous to implement the invention by two time slots.

In CDMA systems there may be a multi-channel connection only in one direction, from a base station to a mobile station. The measurements reported by the mobile station allow a control of the transmission power of the base station on the allocated traffic channels.

BRIEF DESCRIPTION OF THE DRAWINGS

In the following, the invention will be described in greater detail by the primary embodiments with reference to the accompanying drawings in which.

THE PREFERRED EMBODIMENTS OF THE INVENTION

The present invention can be applied to a high-speed data transmission in digital mobile communication systems utilizing various multiple access methods, such as TDMA or CDMA. In different multiple access methods the physical concept of traffic channel varies, being primarily defined by a time slot in TDMA systems, a spreading code in CDMA systems, a radio channel in FDMA systems, a combination thereof, etc. The basic concept of the present invention is, however, independent of the type of the traffic channel and the multiple access method used.

Examples of mobile communications systems include, for example, the Pan-European digital mobile system GSM, DSC1800 (Digital Communication System), UMTS (Universal Mobile Telecommunication System), FPLMTS (Future Public Land Mobile Telecommunication System) etc.

Figure 1:
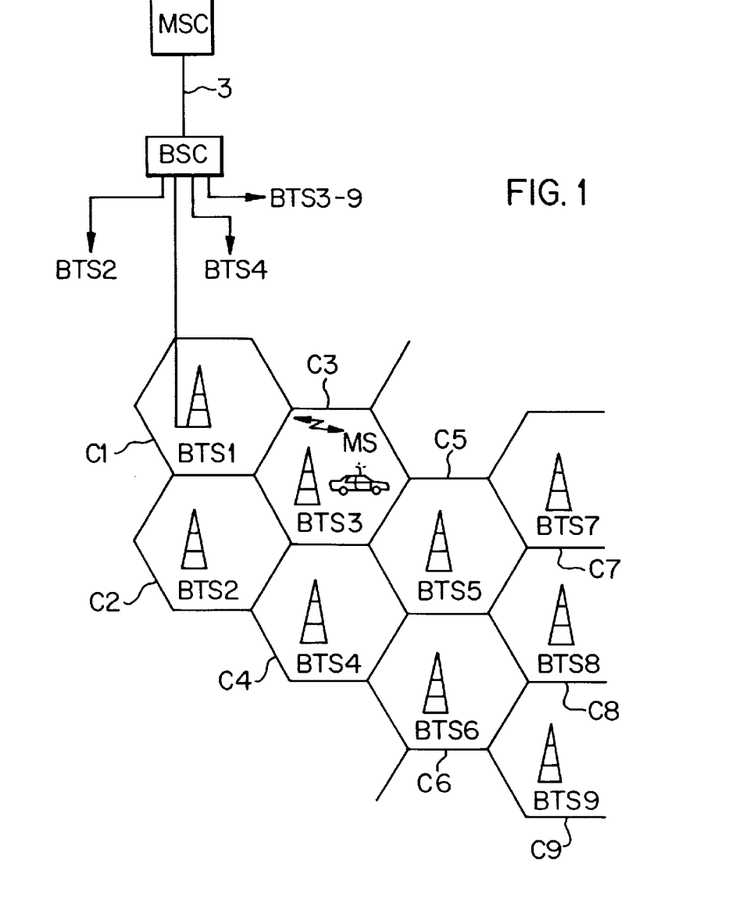
FIG. 1 illustrates a section of a mobile system in which the invention can be applied.

A mobile system of the GSM type is illustrated in FIG. 1 as an example. GSM (Global System for Mobile Communications) is a Pan-European mobile system. FIG. 1 very briefly illustrates the basic elements of the GSM system without going any further into the details or other subsections of the system. For a closer description of the GSM system, the GSM recommendations and "The GSM System for Mobile Communications", by M. Mouly & M. Pautet, Palaiseau, France, 1992, ISBN: 2-9507190-0-7 is referred to.

A mobile services switching centre MSC handles the connecting of incoming and outgoing calls. It performs functions similar to those of an exchange of a public telephone network (PSTN). In addition to these, it also performs functions characteristic of mobile communications only, such as subscriber location management in co-operation with the subscriber registers of the network. As subscriber registers, the GSM system at least includes a home location register HLR and a visitor location register VLR, which are not shown in FIG. 1. More accurate information of the location of the subscriber, usually the accuracy of the location area, is stored in the visitor location register, there being typically one VLR per each mobile services switching centre MSC, while the HLR knows which VLR area the mobile station MS is visiting. The mobile stations MS are connected to the centre MSC by base station systems. The base station system consists of a base station controller BSC and base stations BTS. One base station controller BSC is used to control several base stations BTS. The tasks of the BSC include, among other things, handovers in cases in which the handover is performed within the base station, or between two base stations controlled by the same BSC. FIG. 1 only shows, for reasons of clarity, a base station system in which nine base stations BTS1–BTS9 are connected to a base station controller BSC, the radio coverage area of which base stations forms the corresponding radio cells C1–C9.

The GSM system is a time division multiple access (TDMA) system in which the time division traffic on the radio path takes place in successive TDMA frames each of which consists of several time slots. In each time slot, a short information packet is sent as a radio frequency burst of a finite duration, which burst consists of a number of modulated bits. For the most part, time slots are used for the transmission of control channels and traffic channels. On the traffic channels, speech and data are transmitted. On the control channels, signalling between a base station and mobile subscriber stations is carried out.

Figures 2, 3, 4:
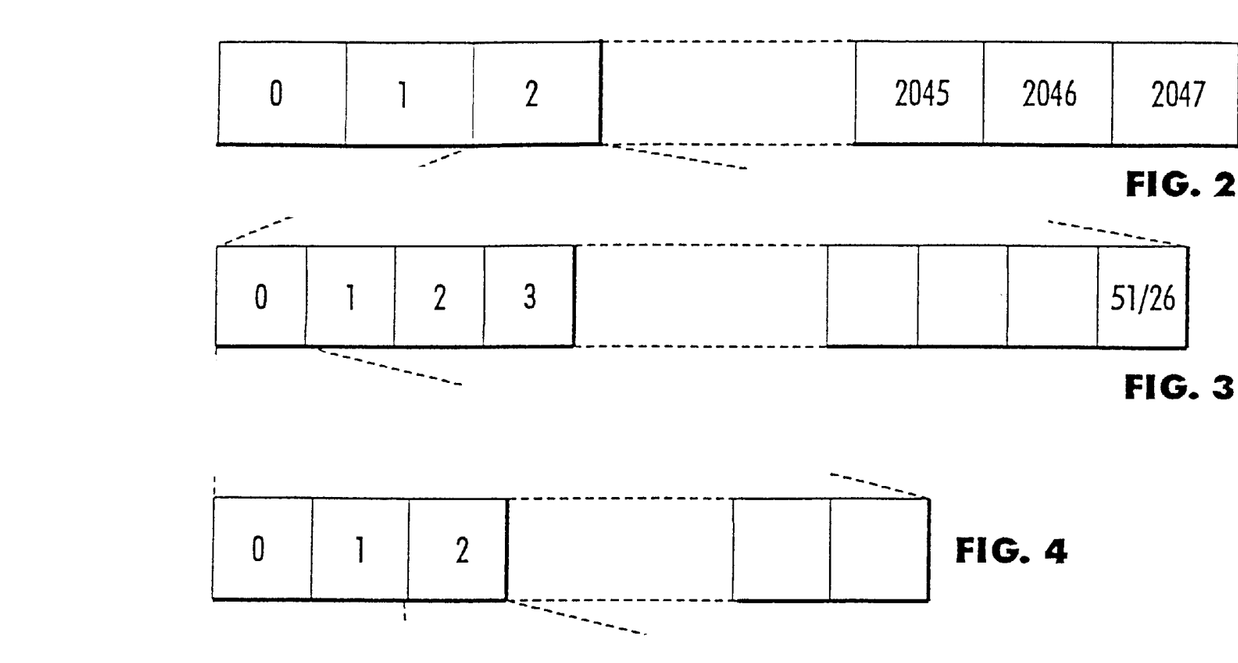
FIGS. 2, 3, 4 and 5 illustrate a TDMA frame format.
Figure 5:
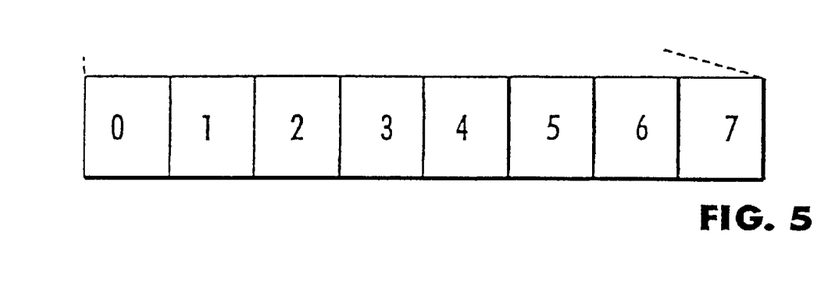

Channel structures used in radio interface of the GSM system are described in closer detail in the ETSI/GSM recommendation 05.02. The TDMA frame format of a the GSM system is illustrated as an example in FIGS. 2–5. A hyperframe is formed of 2,048 superframes, as shown in FIG. 2. A superframe consists of 51 or 26 successive multiframes, depending on whether the multiframes have 26 or 51 frames, as shown in FIG. 3. FIG. 5 illustrates a TDMA basic frame which includes eight time slots 0–7 used as traffic channels or control channels. Thus, only one radio frequency burst shorter than the duration of the time slot is transmitted in each time slot. As soon as one TDMA basic frame ends in time slot 7, the time slot 0 of the next basic frame immediately begins. Thus, 26 or 51 successive TDMA frames form a multiframe depending on whether a traffic channel or a control channel structure is in question, as illustrated in FIG. 4.

Figure 6:
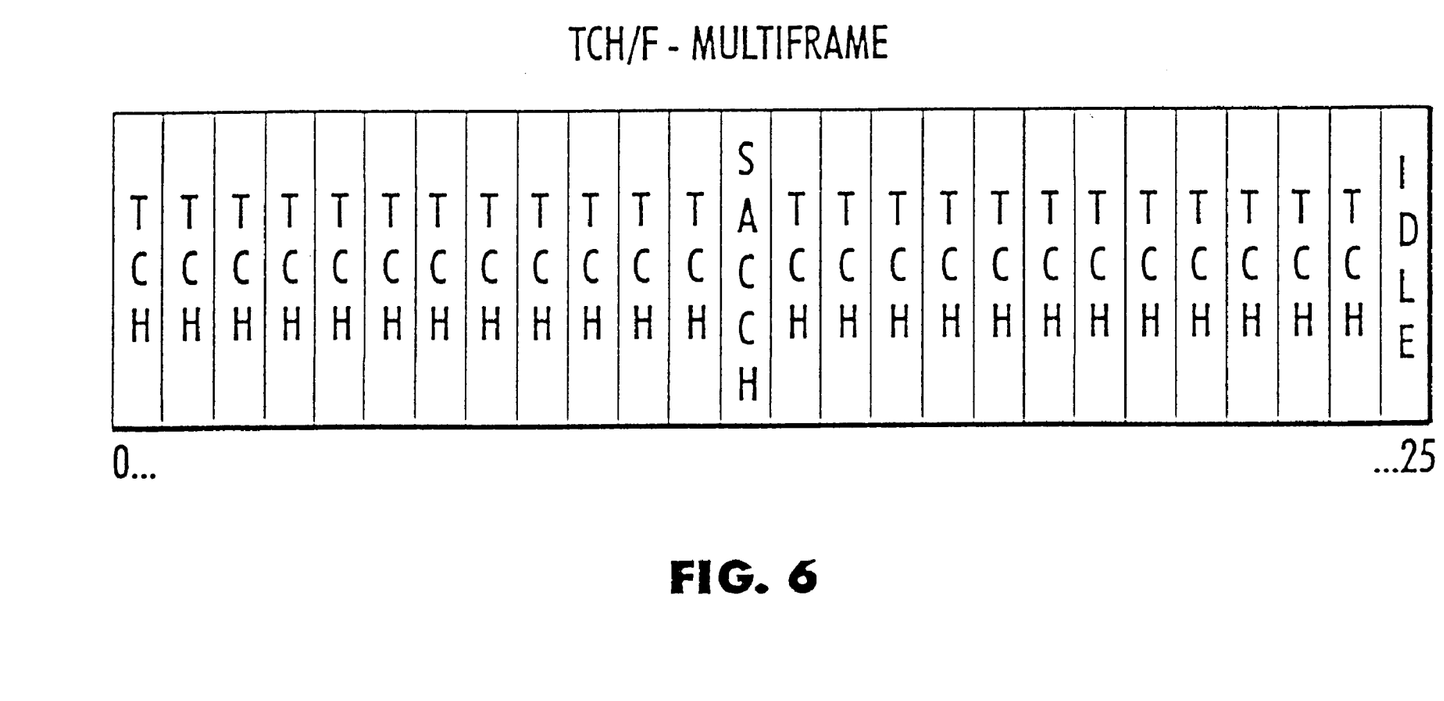
FIG. 6 illustrates a TCH/F+SACCH multiframe.
Figure 7:
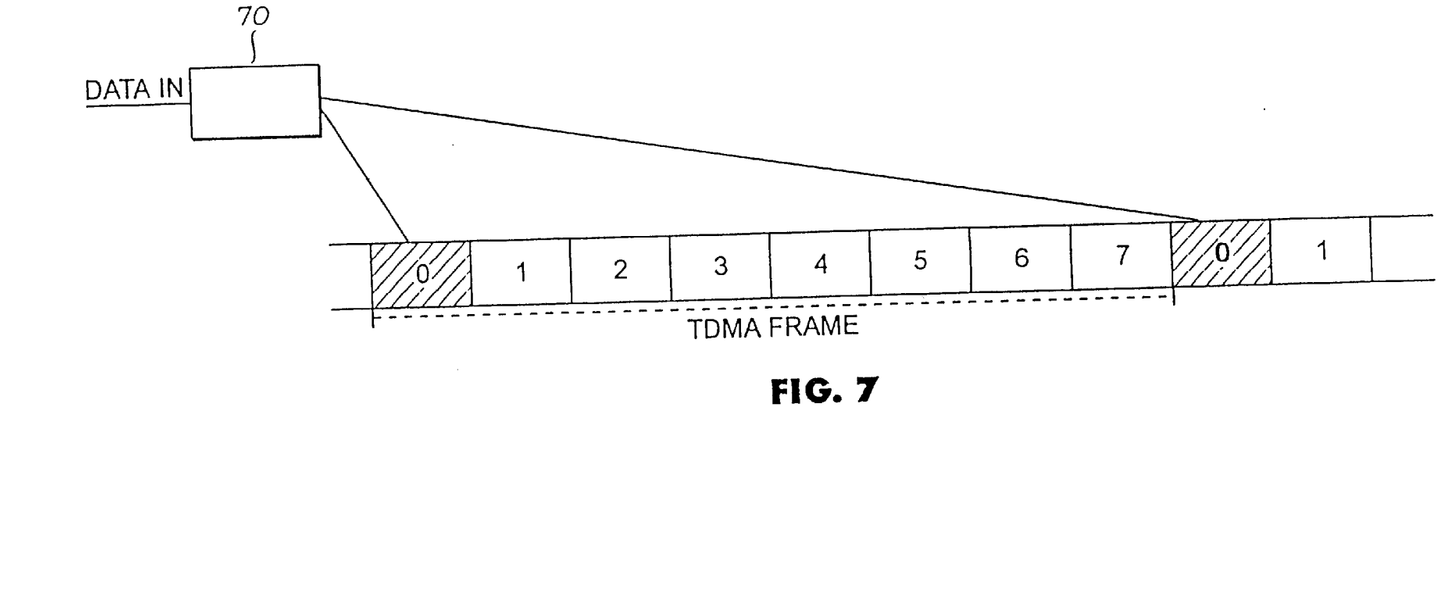
FIG. 7 illustrates a conventional data transmission in one time slot.

FIG. 6 illustrates a structure of a full-speed traffic channel TCH/F-SACCH/TF defined by the recommendation, in which structure a multiframe includes 24 full-speed traffic channel frames TCH, one parallel control channel frame SACCH and a dummy frame IDLE. In each time slot assigned to be used as traffic channels, the control channel SACCH and a dummy time slot are repeated every 26 time slots. The positions of the frames SACCH and IDLE are different for time slots 0, 2, 4 and 6 than for time slots 1, 3, 5, and 7. What is illustrated in FIG. 7 is valid for time slots 0, 2, 4 and 6. In time slots 1, 3, 5 and 7, frames IDLE and SACCH exchange places. The control channel SACCH is used for reporting the measurement results from the mobile station to the fixed radio network, and for controlling of the mobile station, for example, power adjustment, from the fixed radio network.

In normal operation, at the beginning of a call a mobile station MS is assigned one time slot from a carrier wave as a traffic channel (single slot access). The mobile station MS synchronizes into this time slot to transmit and receive radio frequency bursts. In FIG. 7, for example, a mobile station MS is locked to the time slot 0 of a frame. Channel coding, interleaving, burst formation, and modulation 70 are carried out to the data to be transmitted DATAIN, after which operations the radio frequency burst is transmitted in the time slot 0 of each TDMA frame. In the remaining part of the frame, the MS carries out various kinds of measurements, as will be described below.

In accordance with the invention, a mobile station MS requiring data transmission of higher speed than one traffic channel can offer, is assigned two or more time slots from the same frame.

The multi-slot technique according to the invention requires certain additional features in the signalling in connection with traffic channel allocation. During the call set-up time, assigning a traffic channel to a mobile station is carried out by an assignment command which is transmitted to the mobile station by the fixed network. This message must contain the data of all the traffic channels that are assigned to a mobile station MS for high-speed data transmission according to the invention. Already by now, the GSM system must be able to address two half-speed traffic channels in the same assignment command, which is why the message contains descriptions and modes for both the first as well as the second traffic channel. The present assignment command can easily be expanded to cover the addressing of at least two time slots, i.e. full-speed traffic channels. An assignment command is described in the GSM recommendation 04.08, version 4.5.0, June 1993, pp. 168–170. Channel addressing in accordance with the invention can be performed in the assignment command data elements Mode of first channel, mode of second channel, and Channel Description Information element, which are described in greater detail in the GSM recommendation 04.08, version 4.5.0, June 1993, pp. 316–350. For addressing more than two time slots, a new message must be determined. Due to the fact that all the channels addressed are of the same type of channel, TCH/F, the message can be limited to describe the type of the first channel and then the total number of channels required. In such a case, the message would be rather short and simple.

Correspondingly, in case of a handover, the handover command must be able to address two or more time slots in the same frame. In the GSM system, the handover command contains the same data fields as described above in connection with the assignment command, and thus it can be applied to the requirements of the invention with similar changes. The handover command is described in the GSM recommendation 04.08, version 4.5.0, June 1993, pp. 184–189.

A second alternative is to employ a dedicated assignment command for each time slot.

In both cases, both outgoing and incoming call set-up messages (SETUP) of a mobile station must contain information about the actual channel requirements, in other words, the number of time slots needed. This information may be included in the Bearer Capability Information element BCIE. The BCIE is described in the GSM recommendation 04.08, version 4.5.0, pp. 423–431.

Figure 8:
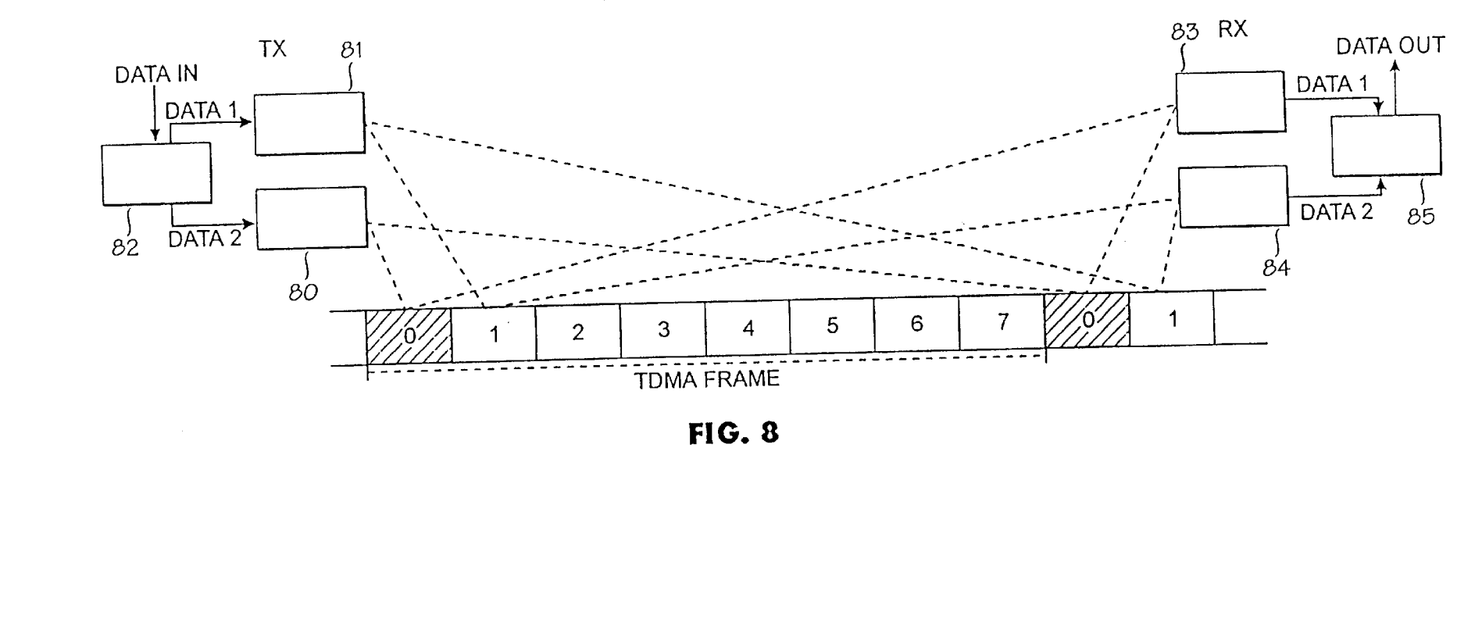
FIG. 8 illustrates data transmission in accordance with the invention in two time slots.

FIG. 8 shows an example in which a mobile station MS is assigned successive time slots 0 and 1 from the same TDMA frame. A high-speed data signal DATAIN to be transferred over the radio path is split in the divider 82 into a necessary number of data signals of lower speed DATA1 and DATA2. Channel coding, interleaving, burst formation and modulation 80, and, correspondingly, 81, are separately carried out to each data signal of lower speed DATA1 and DATA2, after which each data signal is transmitted as a radio frequency burst in its dedicated time slot 0 and 1, respectively. As soon as the lower speed data signals DATA1 and DATA2 are separately transmitted over the radio path, demodulation, deinterleaving and channel decoding 83 and, correspondingly, 84, of the signals are separately performed at the receiving end, after which the signals DATA1 and DATA2 are combined into the original high-speed signal DATAOUT in the combiner 85 at the receiving end.

On the fixed network side, the functions of blocks 80, 81, 83, 84 of FIG. 8, in other words, channel coding, interleaving, burst formation and modulation, and, correspondingly, demodulation, deinterleaving and channel decoding are located advantageously at the base station BTS. The base station BTS has separate, parallel handling for each time slot. The divider 82 and the combiner 85 can, in turn, be assigned, as needed, to any network element such as a base station BTS, a base station controller BSC, or a mobile services switching centre MSC. In cases the divider 82 and the combiner 85 are located in another network element than the base station BTS, the data signals of lower speed DATA1 and DATA2 are transmitted between that element and the base station BTS similarly to signals on normal traffic channels.

In a fixed network of the GSM system, various functions relating to speech coding and rate adaptation are concentrated in a TRCU (Transcoder/Rate Adaptor Unit). The TRCU may be located in several alternative places in the system according to choices made by the manufacturer. Typically, the TRCU is placed at the mobile services switching centre MSC, but it may also be a part of a base station controller BSC or a base station BTS. In cases where the TRCU is placed apart from a base station BTS, information is transmitted between the base station and the transcoder/rate adaptor unit TRCU in so-called TRAU frames. The function of the transcoder/rate adaptor unit is defined in the GSM recommendation 08.60. A combiner 85 and a divider 83 in accordance with the invention may be placed with this transcoder/rate adaptor unit TRCU.

In a mobile station MS, the blocks 80, 81, 83 and 84 of FIG. 8, in other words, channel coding, interleaving, burst formation and modulation, and, correspondingly, demodulation, deinterleaving and channel decoding, are advantageously implemented by a processing unit common to all time slots, at least in an embodiment of two time slots.

As is well known, mobile stations MS can freely roam in the area of a mobile system from one cell to another. If a mobile station is not handling a call, switching from one cell to another is simply a registration to a new cell. If a mobile station MS is handling a call during the switching of cells, the call must also be switched from one base station to another by a way which causes as little disturbance to the call as possible. Switching cells during a call is called a handover. A handover can also be carried out within a cell from one traffic channel to another.

If a mobile station MS roams in a radio network, a handover from the serving cell to a neighbouring cell is normally performed either (1) as the measurement results of the mobile station MS and/or the base station BTS indicate a low signal level and/or quality from the current serving cell and a better signal level can be obtained from a neighbouring cell, or (2) as a neighboring cell enables communication at lower transmitting power levels, in other words, as the mobile station MS is in a border area between cells. In radio networks, the aim is to avoid unnecessarily high power levels and thus interference elsewhere in the network.

Figure 9:
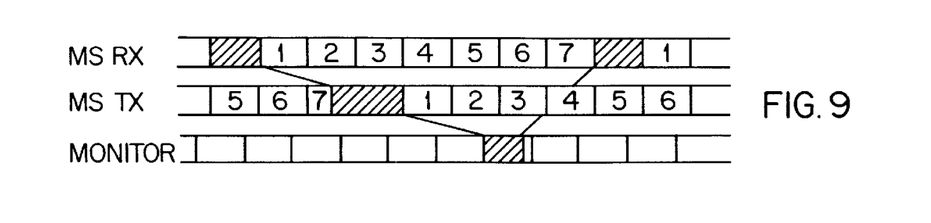
FIG. 9 illustrates the timing of transmission, reception and measurements in a data transmission of one time slot.

In FIG. 9, a mobile station is in a normal manner locked into a time slot 0 of a frame. In the time slot 0, the traffic channel TCH assigned to the mobile station is transmitted. In addition, in every 26th frame of the same time slot a parallel control channel SACCH is transmitted, as described in connection with FIG. 6. According to the GSM recommendations, a mobile station MS monitors (measures) the level and quality of the downlink signal of the serving cell in time slot 0 on the traffic channel TCH assigned to it. During the other time slots, the mobile station MS measures the levels of the downlink signals of the neighbouring cells of the serving cell. All the measurement results of the mobile station MS are regularly transmitted to a base station controller BSC through a parallel control channel SACCH associated with the time slot of traffic channel TCH. The base station BTS monitors (measures) the level and quality of the uplink signal received from each of the mobile stations MS served by said base station BTS.

On the basis of the measurement results, the BSC controls the power of the mobile station MS by power control commands transmitted to the MS in the downlink direction through the control channel SACCH, and makes the handover decisions. The BSC may also use the measurement results to control the transmission power of the serving base station.

Procedures and calculations used in radio networks for determining suitable transmitting power levels are referred to as power control algorithms. There are many different types of algorithms, but usually their aim is the lowest possible transmitting power level and, thus, low interference levels.

Decisions on handovers during on-going calls are made by a base station controller BSC on the basis of various handover parameters assigned to each cell, and on the basis of measurement results reported by a mobile station MS and base stations BTS. A handover is normally carried out on the basis of criteria of the radio path, but it can be performed due to other reasons as well, for example, load sharing. The procedures and calculations used as the basis of a handover decision are referred to as a handover algorithm. Alternatively, all handover decisions can be made at a mobile services switching center MSC to which all the measurement results are in such a case transmitted. An MSC also controls at least those handovers occurring from the area of one base station controller to the area of another.

Figure 10:
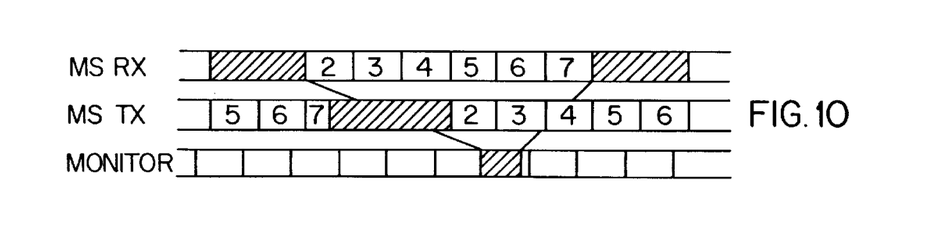
FIG. 10 illustrates the timing of transmission, reception and measurements in a data transmission of two time slots.

As a mobile station is, in accordance with the invention, assigned several time slots within the same frame for high-speed data transmission, the mobile station measures the level and quality of the downlink signal separately in each time slot assigned to it. In the example of FIG. 10, a mobile station MS is assigned the adjacent time slots 0 and 1. The mobile station MS measures the level and quality of the downlink signal of the serving cell independently in time slot 0 and 1 on the traffic channel TCH assigned to it. During the other time slots, the mobile station MS measures the levels of the downlink signals of the neighbouring cells of the serving cell.

In the primary embodiment of the present invention, each time slot assigned to a mobile station MS, the traffic channel TCH, has a dedicated parallel control channel SACCH through which the measurement results relating to the respective time slot are transmitted to a base station controller BSC.

A base station controller BSC controls the transmitting power of a mobile station MS separately in each time slot, in other words, on the traffic channel TCH, by power control commands transmitted to the mobile station MS in the downlink direction through the control channel SACCH of the traffic channel. Power control on an individual channel is otherwise carried out in accordance with the GSM recommendations.

Alternatively, a base station controller BSC may control the transmitting power levels of all the time slots by a common power control command transmitted to the mobile station MS in the downlink direction through one of the parallel control channels.

The handover decision is made by the base station controller on the basis of a combination of measurement results of two or more time slots assigned to a mobile station MS, or on the basis of a measurement result of the poorest time slot. As the decision to carry out a handover is made, a modified handover command is transmitted to the mobile station MS, as described above.

In a second embodiment of the present invention, all the time slots assigned to a mobile station MS, the traffic channels TCH, have a common, parallel control channel SACCH through which a combination of measurement results of the time slots is transmitted to a base station controller BSC. This combination of the measurement results can, for example, be the average value of the measurement results of the various time slots.

The base station controller BSC controls the transmitting power levels of the mobile station MS jointly in all the time slots, in other words, on the traffic channels TCH, by common power control commands transmitted to the mobile station MS in the downlink direction through the common control channel SACCH.

The handover decision is made by the base station controller on the basis of a combination of measurement results of either all or some of the time slots assigned to a mobile station MS. As the decision to carry out a handover is made, a modified handover command is transmitted to the mobile station as described above. As noted above the present invention is universally applicable on various kinds of multiple access methods and traffic channels. In CDMA systems the traffic channels are defined by pseudorandom noise (PN) codes, i.e. spreading codes, assigned to each user or connection. From the present invention point of view the CDMA traffic channel is similar to the TDMA traffic channel. The basic contribution of the present invention is allocate parallel traffic channels to a single user so as to provide a high-speed data connection.

Figure 11:
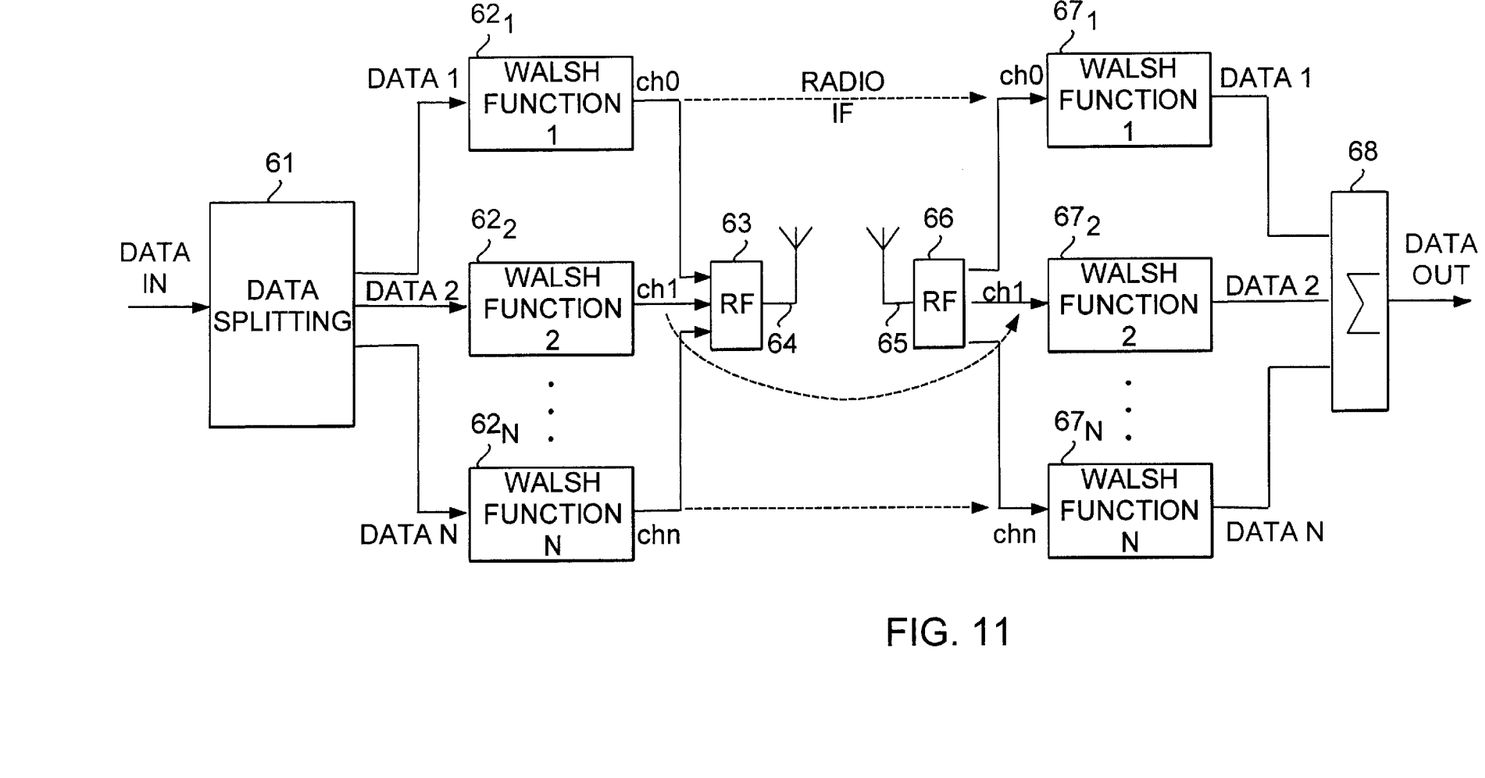
FIGS. 11, 12A and 12B illustrate a high-speed data transmission according to the present invention over N parallel CDMA traffic channels.

Such a high-speed data transmission according to the present invention over N parallel CDMA traffic channels is illustrated in FIG. 11. A high-speed data signal DATAIN that is to be transmitted over the radio path is divided in a data splitter 61 into the required number of slower-speed data signals DATA1 . . . DATAN. A respective number N of parallel CDMA traffic channels ch0 . . . chn is allocated for the transmission. In other words, an unique spreading code is allocated for each slower-speed signal DATA1 . . . DATAN in order to distinguish them from each other during simultaneous transmission over the radio interface. The spreading codes of the system are preferably selected in such a way that the codes used in each system cell are mutually orthogonal, i.e. they do not correlate with each other. One class of suitable orthogonal binary sequencies is called the Walsh function. In the embodiment shown in FIG. 11 the traffic channel separation is done by coding (multiplying) each lower-speed data stream DATA1 . . . DATAN by modified Walsh functions 1 . . . N of length 255 in respective Walsh encoders $62_1$ . . . $62_N$, in order to spread the data streams in bandwidth. The Walsh function is modified so that last bit of all of the functions have been deleted. The spread-spectrum data streams are fed to through radio frequency (RF) parts 63 to an antenna 64 for transmission over the radio interface.

The RF signal received at receiving antenna 65 is fed through radio frequency (RF) parts 66 and split in parallel to correlator branches $67_1$ . . . $67_N$. Correlators $67_1$ . . . $67_N$ are Walsh decoders each of which decodes (multiplies) the received spread-spectrum signal by the Walsh function 1 . . . N of the respective CDMA traffic channel ch0 . . . chn, in order to despread the signal in bandwidth and to restore the original bandwidth of the respective slow-speed data stream DATA1 . . . DATAN. The restored slow-speed data streams DATA1 . . . DATAN are combined in a combiner 68 into a high-speed data stream DATAOUT.

A data transmission according to the present invention through the parallel CDMA traffic channels can thus be according to similar principles as described above for TDMA traffic channels. The only difference is that spreading codes (e.g., Walsh functions) will be used instead of time slots as traffic channels.

In a CDMA system, two or more traffic channels may be allocated for the high-speed data transmission only in one direction (downlink), from the base-station to the mobile station. In the opposite direction (uplink) there may be only one channel for data transmission. The mobile station measures the the characteristics of the received data signal, such as signal level and/or quality, at the mobile station in each of said allocated traffic channels, and reports the measurement results to the network side as described above. The network side employs the measurement results for handover decisions and power control of the base station and the mobile station. The base station also measures the characteristics, such as signal level and/or quality, of the data signal received from the mobile station for the transmission power control of the mobile station. The power control commands are preferably transmitted to the mobile station through the dedicated control channels of all downlink traffic channels as described above. It is also possible, however, that the power control commands are transmitted to the mobile station through only one of the dedicated control channels or through a single common control channel, as described above.

Typically, there are various coding and signal processing operations, such as channel coding (convolutional coding), symbol repetition, interleaving, etc., involved with the data transmission. These additional operations are not essential in the point of view of present invention. In the embodiment of FIG. 11, it is assumed that these coding and interleaving operations, if any, are done to the high-speed data streams DATAIN and DATAOUT prior to the data splitting 61 and subsequent to data combining 68.

Figure 12A:
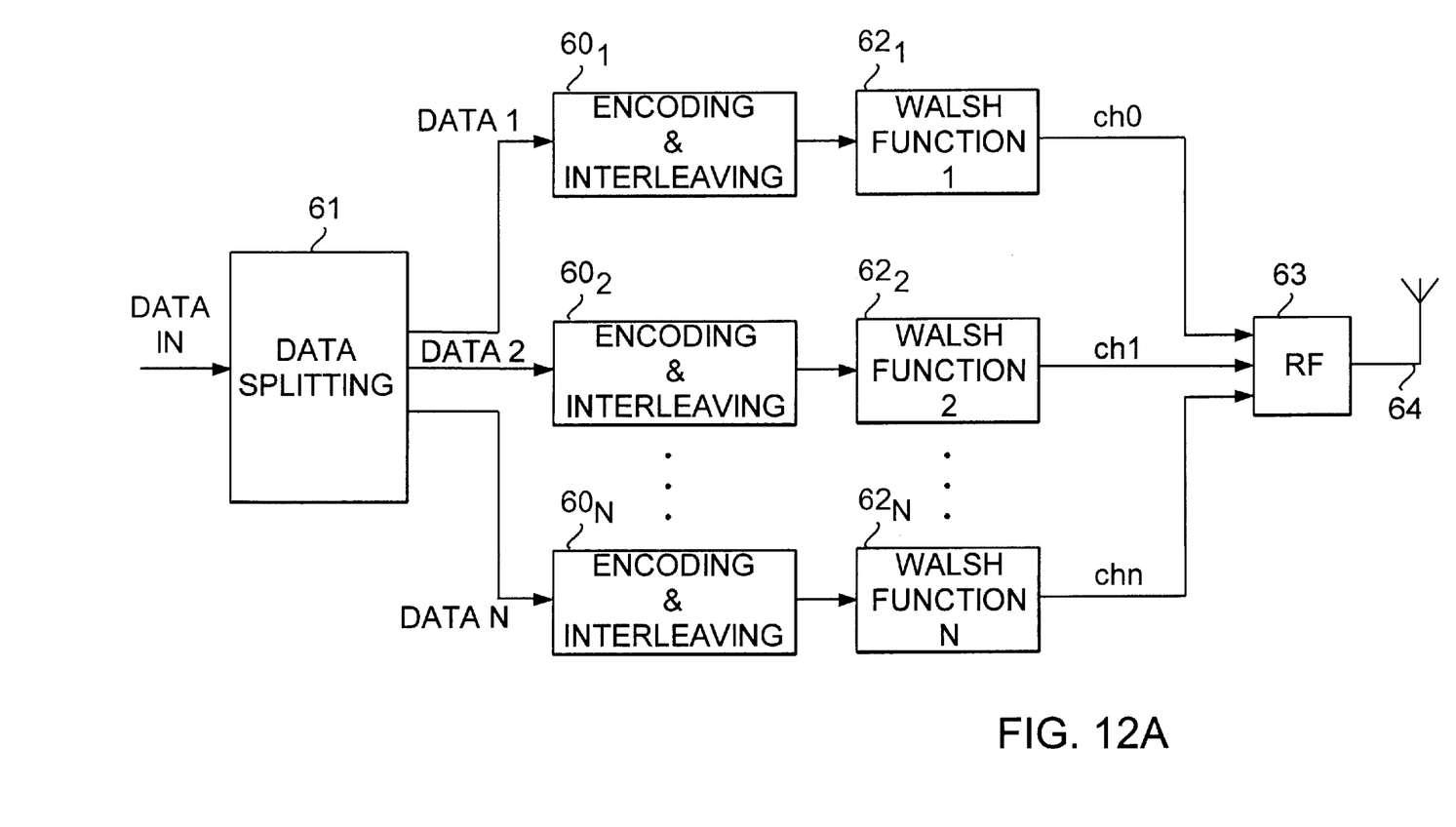
Figure 12B:
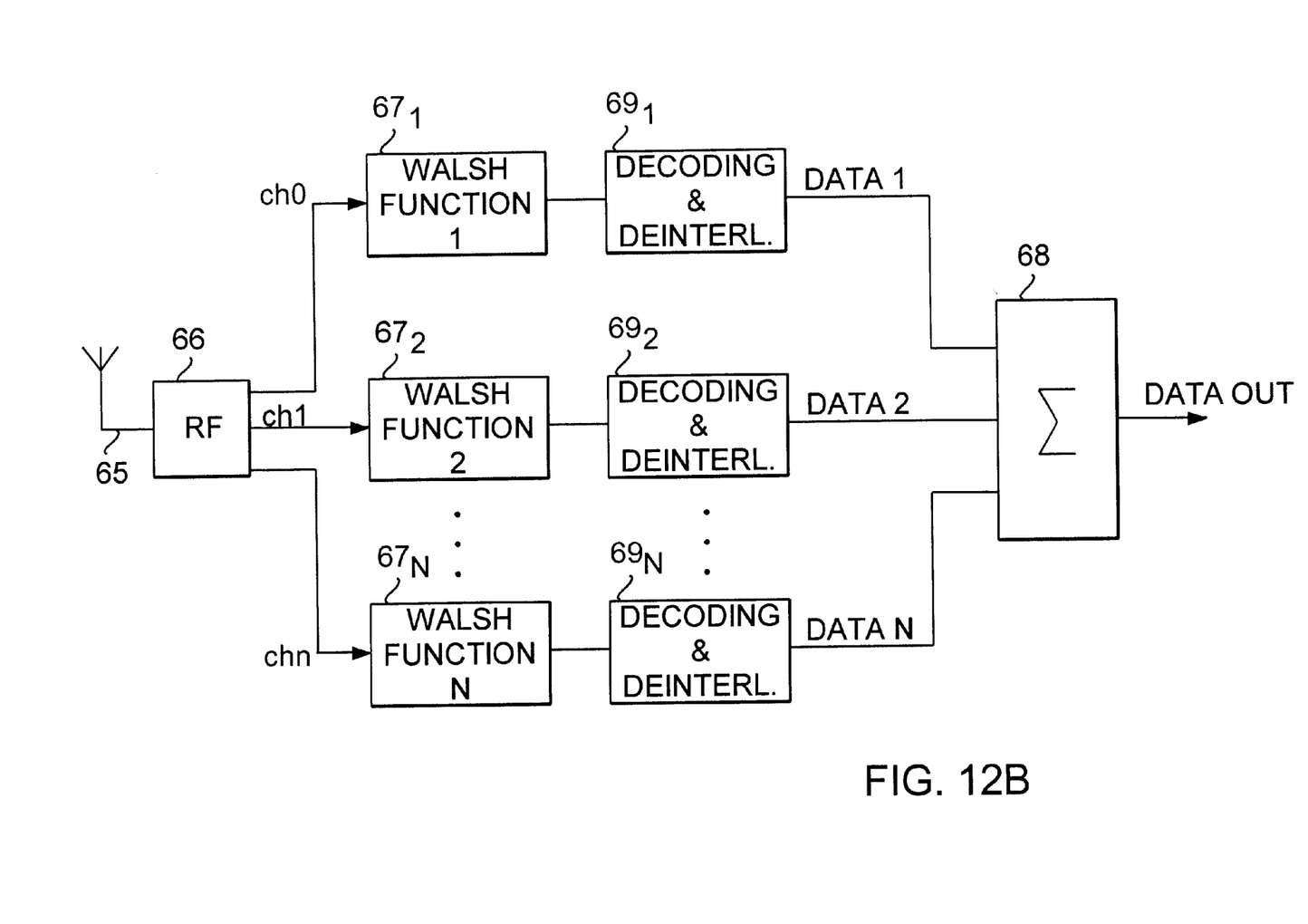

In another embodiment illustrated in FIGS. 12A and 12B, the channel coding, interleaving and other additional operations are done separately on each slowspeed data stream DATA1 . . . DATAN. To this end, encoding and interleaving blocks $60_1 \ldots 60_N$ are provided between the data splitter 61 and the Walsh encoders $62_1 \ldots 62_N$ in the transmitter of FIG. 12A. Similarly, decoding and deinterleaving blocks $69_1 \ldots 69_N$ are provided between the Walsh decoders $67_1 \ldots 67_N$ and the data combiner 68 in the receiver of FIG. 12B.

Figure 13:
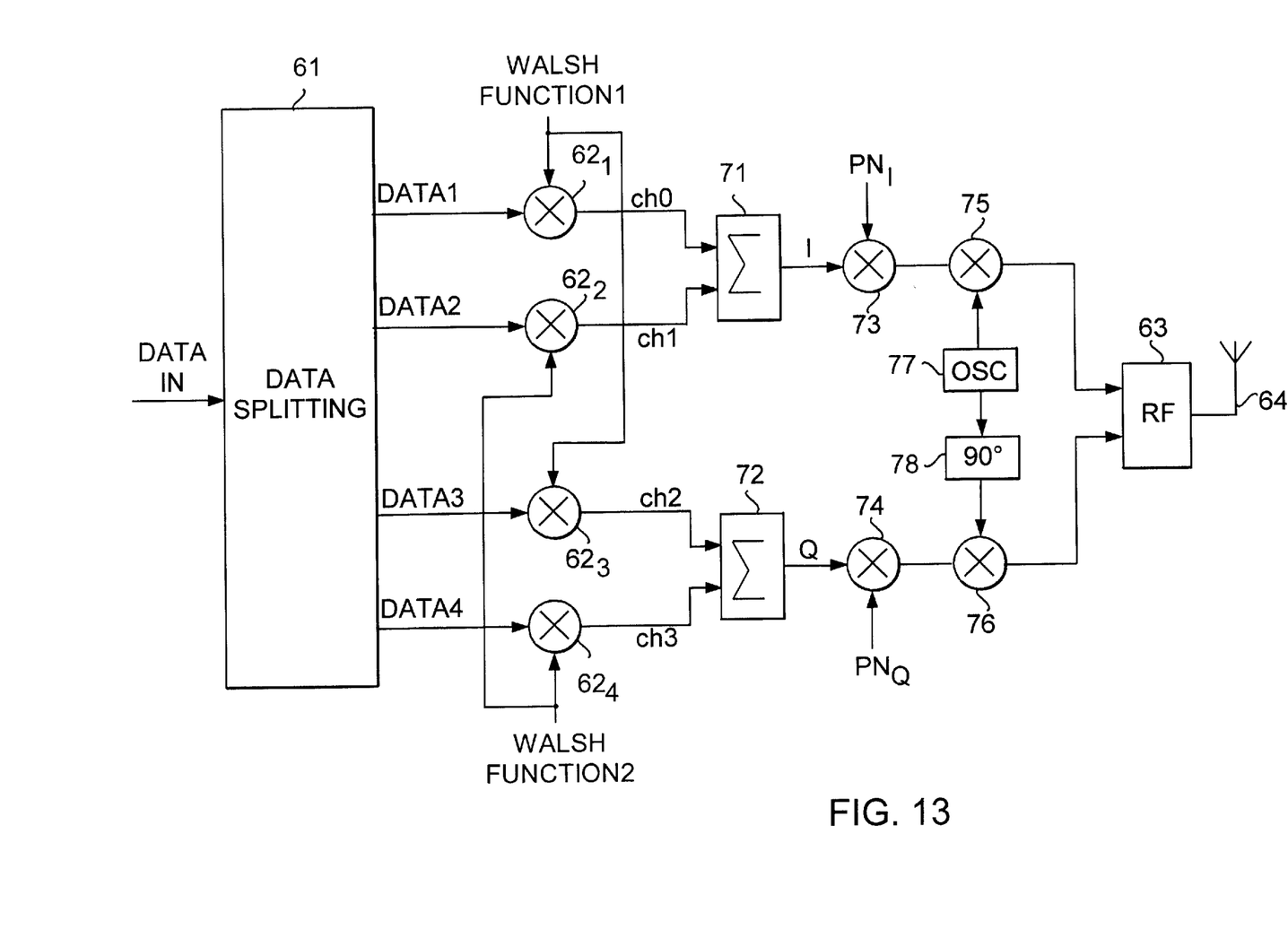
FIG. 13 shows a CDMA transmitter in which four CDMA traffic channels can be divided between quadrature (Q) and in-phase (I) branches in a QPSK modulator.

The RF parts 63 and 66 normally comprise transmitting and receiving filters. Often also a QPSK (Quadrature Phase Shift Keying) modulator is used. FIG. 13 show an example of how four channels can be divided between quadrature (Q) and in-phase (I) branches in a QPSK modulator. High-speed data signal DATAIN is split into slow-speed data streams DATA1 . . . DATA4 and fed to multipliers $62_1 \ldots 62_4$ (Walsh encoders), respectively. In multipliers 62, and 623, data streams DATA1 and DATA3 are multiplied by Walsh function 1. Similarly, in multipliers $62_2$ and $62_4$, data streams DATA2 and DATA4 are multiplied by Walsh function 2. The outputs of multipliers $62_1$ and $62_2$ are summed in summing block 71, and fed to the I branch of the QPSK modulator. The outputs of multipliers $62_3$ and $62_4$ are summed in summing block 72, and fed to the Q branch of the QPSK modulator. The signals of the I and Q branches are multiplied by different spreading codes $PN_I$ and $PN_Q$ in multipliers 73 and 74, respectively. The actual spreading is done by these "outer" spreading codes. The resulting I and Q signals multiplied by the in-phase (from local oscillator 77) and quadrature (via 90 degree phase shifter 78 from the oscillator 77) oscillator signals, and fed through other RF parts 63 to antenna 64.

The Figures and the description referring to them are only intended to illustrate the present invention. The method and arrangement of the invention may vary in details within the scope of the attached claims.

We claim:

1. A method for power control in a mobile telecommunications system, said method comprising:

allocating to a mobile station at least two parallel traffic channels for high-speed data transmission over a radio path between the mobile station and a base station of a fixed radio network;

transmitting a data signal over said allocated traffic channels;

measuring characteristics of the received data signal at the mobile station in each of said allocated traffic channels; and controlling the transmission power of the base station on the basis of at least one of (a) a combination of measurement results of two or more of said allocated traffic channels reported by the mobile station, and (b) a measurement result of the poorest one of said allocated traffic channels reported by the mobile station.

2. A method as claimed in claim 1, further comprising:

assigning to the mobile station a parallel control channel common to all of said allocated traffic channels;

transmitting a combination of measurement results of all the traffic channels from the mobile station to the fixed radio network;

measuring characteristics of a received signal at the base station; and controlling the transmission power of the mobile station through said parallel control channel.

3. A method as claimed in claim 1, further comprising:

assigning to the mobile station a dedicated parallel control channel for each of said allocated traffic channels;

transmitting the measurement results of each of said allocated traffic channels from the mobile station to the fixed radio network;

measuring characteristics of a received signal at the base station; and controlling the transmission power of the mobile station through all of said dedicated control channels.

4. A method as claimed in claim 1, comprising:

assigning to the mobile station a dedicated parallel control channel for each of said allocated traffic channels;

transmitting the measurement results of each of said allocated traffic channels from the mobile station to the fixed radio network;

measuring characteristics of a received signal at the base station; and controlling the transmission power of the mobile station through one of said control channels.

5. A method according to claim 1, wherein said mobile telecommunication system is a code division multiple access (CDMA) system, and said traffic channels are CDMA traffic channels.

6. A method according to claim 5, wherein said CMDA traffic channels are distinguished from each other by different spreading codes.

7. A method according to claim 5, wherein said traffic channels are distinguished from each other by different Walsh functions.

8. A method according to any one of claims 1,2,3,4,5, or 7, further comprising
allocating said at least two parallel traffic channels for a high-speed data transmission only in one direction from the base station to the mobile station.

9. A method according to any one of claims 1, 2, 3, 4, 5, or 7, wherein the measured characteristics of the data signal received at the mobile station include at least one of signal level and quality.

10. A method according to any one of claims 1, 2, 3, 4, 5, or 7, wherein the measured characteristics of the data signal received at the base station include at least one of signal level and quality.

11. A handover method in a mobile telecommunications system said method comprising:
allocating to a mobile station at least two parallel traffic channels for high-speed data transmission over a radio path between the mobile station and a base station of a fixed radio network;
measuring characteristics of a received data signal at the mobile station in each of said allocated traffic channels; and
making a handover decision on the basis of at least one of (a) a combination of measurement results of two or more of said allocated traffic channels, and (b) a measurement result of the poorest one of said allocated traffic channels.

12. A method as claimed in claim 11, further comprising:
assigning to the mobile station a parallel control channel common to all of said allocated traffic channels; and
transmitting a combination of measurement results of all the traffic channels from the mobile station to the fixed radio network through said parallel control channel.

13. A method as claimed in claim 11, further comprising:
assigning to the mobile station a dedicated parallel control channel for each of said allocated traffic channels; and
transmitting the measurement results of each of said allocated traffic channels separately from the mobile station to the fixed radio network through the dedicated parallel control channel of the respective allocated traffic channel.

14. A method according to claim 11, wherein said mobile telecommunication system is a code division multiple access (CDMA) system, and said traffic channels are CDMA traffic channels.

15. A method according to claim 14, wherein said CDMA traffic channels are distinguished from each other by different spreading codes.

16. A method according to claim 14, wherein said traffic channels are distinguished from each other by different Walsh functions.

17. A control arrangement in a mobile telecommunications system for transmitting to a mobile data station and a base station of a fixed radio network, said arrangement comprising:
the fixed network being arranged to allocate to a mobile station at least two traffic channels for high-speed data transmission;
the mobile station being arranged to measure characteristics of a received signal in each of said allocated traffic channels; and
the fixed radio network being arranged to control the transmission power of the base station and/or to make a handover decision on the basis of at least one of (a) a combination of measurement results of two or more of said allocated traffic channels, and (b) a measurement result of the poorest one of said allocated traffic channels.

18. An arrangement as claimed in claim 17, wherein the mobile station has a parallel control channel common to all of said allocated traffic channels, and wherein the base station is arranged to measure the characteristics of the received signal, and wherein the fixed radio network is arranged to control the transmission power of the mobile station through said parallel control channel.

19. An arrangement as claimed in claim 17, wherein the mobile station has a dedicated, parallel control channel for each of said allocated traffic channels, and wherein the base station is arranged to measure the characteristics of the received signal, the fixed network is arranged to control the transmission power of the mobile station through all of said control channels.

20. An arrangement as claimed in claim 17, wherein the mobile station has a dedicated, parallel control channel for each of said allocated traffic channels, and wherein the base station is arranged to measure the characteristics of the received signal and wherein the fixed network is arranged to control the transmission power of the mobile station through one of said control channels.

21. An arrangement according to claim 17, wherein said mobile telecommunications system is a code division multiple access (CDMA) system, and said traffic channels are CDMA traffic channels.

22. An arrangement according to claim 21, wherein said CDMA traffic chann ls are distinguished from each other by different spreading codes.

23. An arrangement according to claim 21, wherein said traffic channels are distinguished from each other by different Walsh functions.

24. An arrangement according to any one of claims 17, 18, 19, 20, 21, 22, or 23, wherein the network is arranged to allocate said at least two parallel traffic channels for high-speed data transmission only in one direction from the base station to the mobile station.

25. A mobile telecommunications system, comprising:
a plurality of mobile stations;
a plurality of base stations; and
a high-speed data transmission mode having at least two parallel traffic channels allocated for high-speed data transmission from respective said base station to respective said mobile station, and a single control channel for controlling a transmission power of respective said mobile station from respective said base station,
said at least two parallel traffic channels being allocated for a high-speed data transmission only in one direction from the base station to the mobile station.

26. A system according to claim 25, wherein said mobile telecommunications system is a code division multiple access (CDMA) system, and said traffic channels are CDMA traffic channels.

27. A system according to claim 26, wherein said CDMA traffic channels are distinguished from each other by different spreading codes.

28. A system according to claim 26, wherein said traffic channels are distinguished from each other by different Walsh functions.

29. A method for power control in a mobile telecommunications system, said method comprising:
allocating at least two parallel traffic channels for high-speed data transmission over the radio path in direction from a base station of a fixed radio network to a mobile station;

transmitting a data signal over said allocated traffic channels from said base station to said mobile station;

measuring characteristics of the received data signal at the mobile station in each of said allocated traffic channels; and controlling the transmission power of a base station on basis of the poorest one of said allocated traffic channels.

30. A method according to claim 29, wherein said mobile telecommunications system is a code division multiple access (CDMA) system, and said traffic channels are CDMA traffic channels.

31. A method according to claim 30, wherein said CDMA traffic channels are distinguished from each other by different spreading codes.

32. A method according to claim 30, wherein said traffic channels are distinguished from each other by different Walsh functions.

33. A mobile telecommunications system, comprising:

a plurality of mobile stations;

a plurality of base stations; and a high-speed data transmission mode having at least two parallel traffic channels allocated to a respective one of said mobile stations only in a downlink direction for high-speed data transmission between a respective serving one of said base stations and said respective one of said mobile stations, and a single control channel for controlling a transmission power of said respective one of said mobile stations from said respective serving one of said base stations.

34. A system according to claim 33, wherein said mobile telecommunications system is a code division multiple access (CDMA) system, and said traffic channels are CDMA traffic channels.

35. A system according to claim 34, wherein said CDMA traffic channels are distinguished from each other by different spreading codes.

36. A system according to claim 34, wherein said traffic channels are distinguished from each other by different Walsh functions.

37. A system according to claim 31, 32, 33 or 34, wherein said at least two parallel traffic channels are allocated for a high-speed data transmission only in one direction from the base station to the mobile station.

38. A mobile telecommunications system, comprising:

a plurality of mobile stations;

a plurality of base stations; and a high-speed data transmission mode having at least two parallel downlink traffic channels allocated to a respective one of said mobile stations only in a downlink direction for high-speed data transmission from a respective serving one of said base stations to said respective one of said mobile stations, and a single downlink control channel for controlling of the transmission power of the selected respective one of the mobile stations.

39. A code division multiple access (CDMA) mobile telecommunications system, comprising:

a plurality of mobile stations;

a plurality of base stations; and a high-speed data transmission mode having at least two parallel CDMA traffic channels allocated to a respective one of said mobile stations for high-speed data transmission from a respective serving one of said base stations to respective ones of said mobile stations, and a single control channel for controlling a transmission power of said respective one of said mobile stations from said respective serving one of said base stations, said at least two parallel traffic channels being allocated for a high speed data transmission only in the direction from the base station to the mobile station.

40. A method for power control in a code division multiple access (CDMA) mobile telecommunications system, said method comprising:

allocating at least two parallel CDMA traffic channels for high-speed data transmission over the radio path in direction from a base station of a fixed radio network to a mobile station;

transmitting a data signal over said allocated CDMA traffic channels from said base station to said mobile station;

measuring characteristics of the received data signal at the mobile station in each of said allocated CDMA traffic channels; and controlling the transmission power of the base station on basis of the poorest one of said allocated CDMA traffic channels.

41. A code division multiple access (CDMA) mobile telecommunications system, comprising:

a plurality of mobile stations;

a plurality of base stations;

a high-speed data transmission mode having at least two parallel CDMA traffic channels allocated to a respective one of said mobile stations for high-speed data transmission between a respective serving one of said base stations and said respective one of said mobile stations; and a single control channel for controlling a transmission power of said respective one of said mobile stations from said respective serving one of said base stations, wherein said at least two parallel traffic channels are allocated for a high-speed data transmission only in one direction from the base station to the mobile station.

42. A code division multiple access (CDMA) mobile telecommunications system, comprising:

a plurality of mobile stations;

a plurality of base stations; and a high-speed data transmission mode having at least two parallel downlink CDMA traffic channels allocated to a respective one of said mobile stations for high-speed data transmission from a respective serving one of said base stations to a respective serving one of said mobile stations, and a single downlink control channel for controlling of the transmission power of said respective serving one of the mobile stations, wherein said at least two parallel traffic channels are allocated for a high-speed data transmission only in one direction from the base station to the mobile station.

* * * * *